(12) United States Patent
Tuneld et al.

(10) Patent No.: US 12,019,719 B2
(45) Date of Patent: Jun. 25, 2024

(54) METHOD AND ELECTRONIC DEVICE FOR AUTHENTICATING A USER

(71) Applicant: Fingerprint Cards AB, Gothenburg (SE)

(72) Inventors: Mats Tuneld, Lund (SE); Christian Gehrmann, Lund (SE); Eric Setterberg, Västra Frölunda (SE)

(73) Assignee: FINGERPRINT CARDS ANACATUM IP AB, Gothenburg (SE)

(*) Notice: Subject to any disclaimer, the term of this patent is extended or adjusted under 35 U.S.C. 154(b) by 746 days.

(21) Appl. No.: 17/056,042

(22) PCT Filed: Jun. 18, 2019

(86) PCT No.: PCT/SE2019/050577
§ 371 (c)(1),
(2) Date: Nov. 17, 2020

(87) PCT Pub. No.: WO2019/245437
PCT Pub. Date: Dec. 26, 2019

(65) Prior Publication Data
US 2021/0365531 A1 Nov. 25, 2021

(30) Foreign Application Priority Data
Jun. 19, 2018 (SE) .................... 1850741-8

(51) Int. Cl.
*G06F 21/32* (2013.01)
(52) U.S. Cl.
CPC .................... *G06F 21/32* (2013.01)

(58) Field of Classification Search
CPC ......... G06F 21/32; G06F 21/83; G06V 40/53; G06V 40/10; G06V 40/1365; H04L 9/088; H04L 9/3231; H04L 9/3271
See application file for complete search history.

(56) References Cited

U.S. PATENT DOCUMENTS

| 8,406,478 | B2 | 3/2013 | Chen et al. |
| 8,670,599 | B2 * | 3/2014 | Lee .................. A61B 5/1172 348/77 |
| 9,536,131 | B1 | 1/2017 | Chiang et al. |
| 9,710,630 | B2 * | 7/2017 | Kim .................. G06V 40/1335 |
| 2002/0184488 | A1 * | 12/2002 | Amini .................. H04L 9/0891 713/153 |

(Continued)

FOREIGN PATENT DOCUMENTS

| AU | 2017101425 A4 * | 11/2017 | ............ G06F 21/31 |
| CN | 105900101 A * | 8/2016 | ....... G06F 17/30867 |

(Continued)

OTHER PUBLICATIONS

International Search Report and Written Opinion for International Application No. PCT/SE2019/050577 mailed Oct. 28, 2019, 14 pages.

*Primary Examiner* — Shahriar Zarrineh
(74) *Attorney, Agent, or Firm* — RMCK Law Group, PLC (57) ABSTRACT

The present disclosure generally relates to a method for authenticating a user using an electronic device, where the electronic device comprises a biometric sensing system as well as a first, a second and a third control unit. The present disclosure also relates to a corresponding electronic device and to a computer program product.

20 Claims, 4 Drawing Sheets

(56) References Cited

U.S. PATENT DOCUMENTS

| | | |
|---|---|---|
| 2004/0236954 A1 | 11/2004 | Vogt et al. |
| 2008/0019573 A1 | 1/2008 | Baltatu et al. |
| 2008/0320600 A1* | 12/2008 | Pandiscia .............. H04L 9/3231 726/27 |
| 2009/0164797 A1 | 6/2009 | Kramer |
| 2010/0328032 A1* | 12/2010 | Rofougaran ........ H04W 12/062 340/5.82 |
| 2013/0308838 A1 | 11/2013 | Westerman et al. |
| 2014/0195815 A1* | 7/2014 | Taveau .................... G06F 21/32 713/186 |
| 2016/0147987 A1* | 5/2016 | Jang ................... G06V 40/1365 726/19 |
| 2016/0253652 A1* | 9/2016 | Je ........................ G06Q 20/382 705/39 |
| 2017/0220845 A1* | 8/2017 | Christensen ....... G06V 40/1306 |
| 2017/0286657 A1* | 10/2017 | Weber ................ G06V 40/1353 |
| 2017/0300740 A1* | 10/2017 | Russo ................ G06V 40/1388 |
| 2017/0330021 A1 | 11/2017 | Westerman et al. |
| 2018/0012010 A1* | 1/2018 | Weber ..................... G06F 21/32 |
| 2018/0101669 A1* | 4/2018 | Benoit ................ G06V 10/955 |
| 2018/0107885 A1* | 4/2018 | Jo ....................... G06V 40/1365 |
| 2018/0211023 A1* | 7/2018 | Ronnow ............... H04W 12/33 |
| 2020/0175143 A1* | 6/2020 | Lee ....................... G06F 3/0446 |

FOREIGN PATENT DOCUMENTS

| | | | | |
|---|---|---|---|---|
| CN | 108292334 B | * | 4/2022 | ............ G06F 21/32 |
| EP | 2797019 A1 | * | 10/2014 | ............ G06F 21/32 |
| GB | 2546459 A | | 7/2017 | |
| JP | 2003134107 A | * | 5/2003 | |
| JP | 2005293490 A | * | 10/2005 | |
| KR | 20100001911 A | * | 1/2010 | |
| KR | 20180001122 U | * | 4/2018 | |
| KR | 20180041016 A | * | 4/2018 | |
| KR | 20180079950 A | * | 7/2018 | |

* cited by examiner

METHOD AND ELECTRONIC DEVICE FOR AUTHENTICATING A USER

CROSS-REFERENCE TO RELATED APPLICATIONS

This application is a 371 U.S. National Stage of International Application No. PCT/SE2019/050577, filed Jun. 18, 2019, which claims priority to Swedish Patent Application No. 1850741-8, filed Jun. 19, 2018. The disclosures of each of the above applications are incorporated herein by reference in their entirety.

TECHNICAL FIELD

The present disclosure generally relates to a method for authenticating a user using an electronic device, where the electronic device comprises a biometric sensing system as well as a first, a second and a third control unit. The present disclosure also relates to a corresponding electronic device and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic devices, such as smartphones, watches, tablets, or any other type of electronic devices where personalized user interaction is advantageous. There has also been suggested to integrate such a fingerprint sensor with smartcard systems, possibly eliminating the need for the user to input a PIN code when performing e.g. a financial transaction.

However, due to the mobility of the above mentioned electronic devices, there is always a risk that the electronic device falls in the "wrong hands" and/or are presented with e.g. a hacker attack with the purpose of falsify or otherwise affect a biometric identification and/or authentication process.

To counteract such attempts there is a continued attempt to improve the applied biometric identification and/or authentication process. However, such attempts typically result in complex computational processing, thereby increasing the need to equip the electronic equipment with a faster and more computationally strong processing environment.

In some implementations of the above mentioned types of electronic devices, where a high security and computationally strong processing environment is desired, it has been suggested to "split" the computational performance into two parts, the first being a high-performance environment and the second being a high-security environment. The high-performance environment generally has higher computing performance but less security. Correspondingly, the high-security environment, for example comprising a so called secure element, generally has higher security but less computing performance.

An example of such an implementation is disclosed in U.S. Pat. No. 9,536,131. U.S. Pat. No. 9,536,131 provides an interesting approach to dividing the computational resources need for performing biometric authentication, specifically in relation to fingerprint authentication between a first and a second processing unit, the first processing unit providing the above mentioned high-performance environment and the second processing unit providing the above mentioned high-security environment. In accordance to U.S. Pat. No. 9,536,131, the high-performance first processing unit is used for performing a comparison process between an acquired fingerprint image of a user and a prerecorded fingerprint template for a finger of the user that is to be authenticated.

Unfortunately, the solution presented in U.S. Pat. No. 9,536,131 introduces some possible security risks by means of how the computational processing is divided between the first and the second processing unit.

SUMMARY

In view of above-mentioned problems with prior-art, it is an object of the present disclosure to provide a further balanced solution for efficiently dividing computational resources, while maintaining high security, in regards to biometric authentication of a user using an electronic device.

According to an aspect of the present disclosure, it is therefore provided a method of authenticating a user using an electronic device, the electronic device comprising a biometric sensing system configured for capturing a biometric representation of the user, a first control unit connected to the biometric sensing system and adapted to provide a processing environment having a first security level, a second control unit arranged in communication with the first control unit and adapted to provide a processing environment having a second security level, and a third control unit arranged in communication with the second control unit and adapted to provide a processing environment having a third security level, wherein the second security level is lower than the first and the third security level and the method comprises the steps of acquiring a biometric representation using the biometric sensing system and the first control unit, determining, using the first control unit, a first set of features indicative of the biometric representation, forming, using the first control unit, a protected representation of the first set of features, providing the biometric representation and the protected representation of the first set of features to the second control unit, determining, using the second control unit, a second set of features indicative of the biometric representation, providing the protected representation of the first set of features and the second set of features to the third control unit, extracting, at the third control unit, the first set of features from the protected representation of the first set of features, thereby forming an extracted representation of the first set of features, and authenticating, at the third control unit, the user based on a biometric template arrangement representative for the biometric representation of the user, the extracted representation of the first set of features and the second set of features.

The principal idea behind the present disclosure resides in an improved segmentation of a biometric authentication process, where some portions of the biometric authentication process is performed by the first control unit and some other portions of the biometric authentication process is performed by the second control unit. In accordance to the present disclosure, the third control unit will in turn be used for "double matching" of the first and the second set of features, in relation to previously formed biometric template for the user.

Consequently, in a preferred embodiment the second control unit is adapted to provide a performance environment being higher as compared to the first control unit. In addition, in a possible embodiment of the present disclosure the first and the third control unit provide a secure processing environment.

In comparison to prior art, the present disclosure allows for an adaptation of the biometric authentication process, where a two separate feature extraction processes are performed by two different control units (i.e. the first and the second), and where a third control unit is arranged to perform the double matching process, where the result of the two features extraction processes is compared with the biometric template arranged at the third control unit.

In accordance to the present disclosure, the first and the third control unit is indicated to have a higher security level than the second control unit. The expression "higher security level" should be understood to relate to a processing environment where a trusted processing of personal data is made possible, such as for performing the determination of the first set of features indicative of the biometric representation and for performing the final authentication of the user. Such a processing environment (for example made possible using a so called secure element) will provide a root of trust such that that processes running on at least the first and the third control unit are executed in a controlled and trusted environment. In addition to conventional password or encryption protection, alternative security features may be introduced from both software and hardware levels based on e.g. the embedded secure element.

To ensure that the features extracted at the first control unit are "untouched" by e.g. a third party, the first control unit forms a protected version of the first set of features. In one embodiment, the protection of the first set of features comprises ensuring an integrity the first set of features, in a manner where the third control unit later may verify the integrity of the first set of features.

However, in a preferred embodiment the protection of the first set of features also comprises ensuring both confidentiality (e.g. by means of encryption) and integrity of the first set of features. Accordingly, in line with such an embodiment, it may be preferred to ensure that the transmission of the first and/or the second set of features between the first and the third as well as between the second and the third control unit includes providing a challenge from the third control unit to the first control unit as well as a challenge from the third control unit to the second control unit. The implementation of such a "challenge-response" process may e.g. be made in line with known processes.

As an alternative (or also), it may be possible to allow also for a timestamp to be included with the protected first set of features, where the timestamp may be used for ensuring a "freshness" of the first set of data provided from the first control unit to the third control unit. That is, e.g. the time stamp may be compared to a "time threshold", where possibly the first set of features may be discarded if it is e.g. "too old". In such a situation, the double matching will not be successful, since no first set of features will be "available" to be used in a matching process involving the first biometric template.

In an embodiment of the present disclosure, biometric template arrangement comprises a first ($T_{vl}$) and a second ($T_{vh}$) biometric template portion. Accordingly, the authentication process may involve comparing/matching the first set of features with the first biometric template portion, and comparing/matching the second set of features with the second biometric template portion. Accordingly, in one embodiment the "structure" of the first template portion matches a "structure" of the first biometric template portion (comparable for the second set of features and the second biometric template portion), e.g. for the purpose of ensuring efficient comparison/matching there between.

In a preferred embodiment of the present disclosure, the user is authenticated based both on a first comparison between the extracted representation of the first set of features and the first biometric template portion and a second comparison between the second set of features and the second biometric template portion. Accordingly, the user is only authenticated if the both the first and the second comparison is indicated as successful.

In line with the present disclosure, it may be possible to allow the feature extraction process implemented by the first control unit to be "computational lighter" as compared to the feature extraction process implemented by the second control unit, since the second control unit (as mentioned above) in a typical embodiment is adapted to provide a performance environment being higher as compared to what is provided by the first control unit.

Accordingly, by means of the present disclosure it is possible to allow advanced authentication processes with high computational requirements to be implemented while still ensuring the authentication process to have, in comparison to prior art, high security and less risk of a successful hacker attack. In addition to the above, it should of course be understood that the general segmentation of the authentication process may be highly useful also in implementations of electronic devices where the capability secure process is limited due to cost and/or real estate reasons, such as for example in relation to a smartcard implementation.

Within the context of the present disclosure, the expression "control unit" should be understood to include any type of computing device, such as an ASIC, a micro-processor, etc. It should also be understood that the actual implementation of such a control unit may be divided between more than a single element/device/circuit, collectively still referred to as a control unit. Preferably, the second control unit is arranged separately from the first control unit.

In case the user is successfully authenticated, it may in accordance to the present disclosure be possible to perform at least one action. Such an action may for example be for the electronic device for allowing the user to perform further operations using the electronic device, such as when the electronic device is a mobile phone or a tablet. The at least one action may of course be any type of action suitably used when there is a need to authenticate the user, such as allowing a financial transaction to be proceeded. In case of a successful authentication, it may also be possible to update the first biometric template based on at least one of the first and the second set of features.

In one exemplary embodiment of the present disclosure, the first control unit is connected to and configured to control the operation of the biometric sensing system. Such an implementation may for example be useful in relation to situation where the electronic device is the mentioned mobile phone/tablet, laptop, etc.

Based on the fact that the first control unit is somewhat "weaker" form a computational perspective in comparison to the second control unit, it may in some embodiments be advantageous to determine the first set of features from a sub-section of the biometric representation. A sub-section may in accordance to the present disclosure be seen as comprising e.g. cropping, decimation or truncation process for reducing the amount of data that is to be processed. Accordingly, a reduced amount of information is thus processed for the determination of the first set of features, thereby possibly balancing the computational capability of the first control unit.

In a possible embodiment, the sub-section of the biometric representation is selected by the first control unit. Such an implementation will again disallow any third party in being involved with what information is selected further use in comparison with the main/first biometric template. It may be preferred to allow this selection to be at least partly random, or at least to be different for different biometric representations (such as different for consecutive authentications of the biometric representation of the user).

For further ensuring an adequate security for the authentication process, it may in some embodiments be possible to arrange for the share a symmetric integrity protection key (K) to be used in protecting and extracting the first set of features. Correspondingly, a different symmetric integrity protection key may be used for the same purpose in regards to transmission of the second set of features between the second and the third control unit.

It should be understood that it, as an alternative, may be possible to use a scheme based on asymmetric cryptography for achieving a suitable integrity protection in regards to at least one of the first and the second set of features in line with the discussion above.

In a preferred embodiment of the present disclosure the biometric sensing system is configured for capturing a fingerprint representation of a fingerprint pattern of a finger of the user. In line with such an embodiment, the expressions "representation of a fingerprint pattern of a finger of the user" or "fingerprint image" should be interpreted broadly and to include both a regular "visual image" of a fingerprint of a finger as well as a set of measurements relating to the finger when acquired using a fingerprint sensor. A plurality of fingerprint representations/images may be subsequently acquired and fused together, where the resulting information is used as an input for determining the sets of features.

The mentioned fingerprint sensor may be implemented using any kind of current or future fingerprint sensing principle, including for example capacitive, optical, or thermal sensing technology, as well as a combination thereof. Both one and two-dimensional sensors are possible and within the scope of the present disclosure.

In another possible embodiment of the present disclosure the biometric sensing system is configured for capturing at least one of an image of the user and a representation of an iris of the user. Likewise, e.g. a camera or other means may be used for capturing e.g. the image of the user or the iris of the user. Other implementations are possible for acquiring e.g. a representation of the iris of the user.

According to another aspect of the present disclosure, there is provided an electronic device, comprising a biometric sensing system configured for capturing a biometric representation of the user, a first control unit connected to the biometric sensing system and adapted to provide a processing environment having a first security level, and a second control unit arranged in communication with the first control unit and adapted to provide a processing environment having a second security level, wherein the electronic device is adapted to acquire a biometric representation using the biometric sensing system and the first control unit, determine, using the first control unit, a first set of features indicative of the biometric representation, form, using the first control unit, a protected representation of the first set of features, provide the biometric representation and the protected representation of the first set of features to the second control unit, determine, using the second control unit, a second set of features indicative of the biometric representation, provide the protected representation of the first set of features and the second set of features to a third control unit, wherein the third control unit is arranged in communication with the second control unit and adapted to provide a processing environment having a third security level, the second security level being lower than the first and the third security level, extract, at the third control unit, the first set of features from the protected representation of the first set of features, thereby forming an extracted representation of the first set of features, and authenticate, at the third control unit, the user based on a biometric template arrangement representative for the biometric representation of the user, the extracted representation of the first set of features and the second set of features. This aspect of the present disclosure provides similar advantages as discussed above in relation to the previous aspect of the present disclosure.

In an embodiment, the electronic device further comprises the third control unit. As an alternative, the third control unit may be arranged remotely from the electronic device.

According to a further aspect of the present disclosure, there is provided a computer program product comprising a computer readable medium having stored thereon computer program means for controlling an electronic device, the electronic device comprising a biometric sensing system configured for capturing a biometric representation of the user, a first control unit connected to the biometric sensing system and adapted to provide a processing environment having a first security level, a second control unit arranged in communication with the first control unit and adapted to provide a processing environment having a second security level, and a third control unit arranged in communication with the second control unit and adapted to provide a processing environment having a third security level, wherein the second security level is lower than the first and the third security level and the computer program product comprises code for acquiring a biometric representation using the biometric sensing system and the first control unit, code for determining, using the first control unit, a first set of features indicative of the biometric representation, code for forming, using the first control unit, a protected representation of the first set of features, code for providing the biometric representation and the protected representation of the first set of features to the second control unit, code for determining, using the second control unit, a second set of features indicative of the biometric representation, code for providing the protected representation of the first set of features and the second set of features to the third control unit, code for extracting, at the third control unit, the first set of features from the protected representation of the first set of features, thereby forming an extracted representation of the first set of features, and code for authenticating, at the third control unit, the user based on a biometric template arrangement representative for the biometric representation of the user, the extracted representation of the first set of features and the second set of features. Also this aspect of the present disclosure provides similar advantages as discussed above in relation to the previous aspects of the present disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIGS. 1A and 1B, FIG. 3A conceptually shows an architectural block structure implemented at an electronic device shown in FIGS. 1A and 1B and in line with the present disclosure.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like features throughout.

Figure 1A:
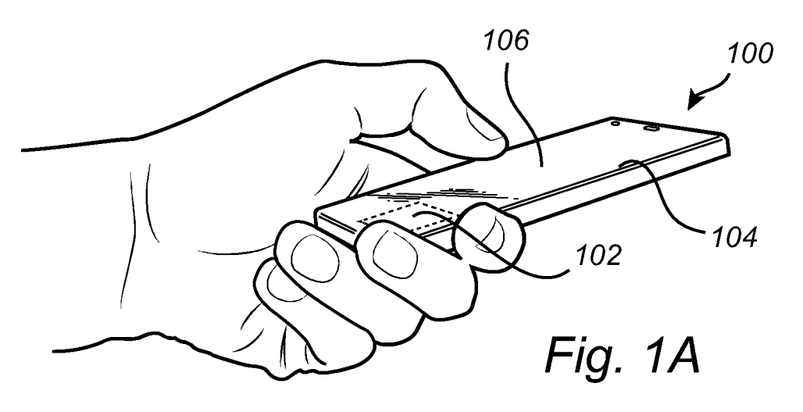
FIGS. 1A and 1B illustrate example implementations of different electronic devices according to currently preferred embodiments of the present disclosure, FIG. 2 schematically shows an example of a fingerprint sensor array comprised in the electronic device shown in e.g.

Turning now to the drawings and to FIG. 1A in particular, there is schematically illustrated a first example of an electronic device according to the present disclosure, in the form of a mobile phone 100 with an integrated biometric sensing system and a display unit 104 with a touch screen interface 106. In this embodiment the biometric sensing system is exemplified with a fingerprint sensor arranged at a front side of the mobile phone 100. The fingerprint sensor 102 may, for example, be used for unlocking the mobile phone 100 and/or for authorizing transactions carried out using the mobile phone 100, etc. As an alternative, the biometric sensing system may for example be arranged to comprise a camera (or similar) arranged to capture e.g. an image of the face or the iris of the user, to be used for authenticating the user.

Preferably and as is apparent for the skilled person, the mobile phone 100 shown in FIG. 1A further comprises a first antenna for WLAN/Wi-Fi communication, a second antenna for telecommunication communication, a microphone, a speaker, and a phone control unit. Further hardware features are of course possibly comprised with the mobile phone. It should furthermore be noted that the present disclosure may be applicable in relation to any other type of portable electronic device, such as a laptop, a remote control, a tablet computer, or any other type of present or future similarly configured device.

Figure 1B:
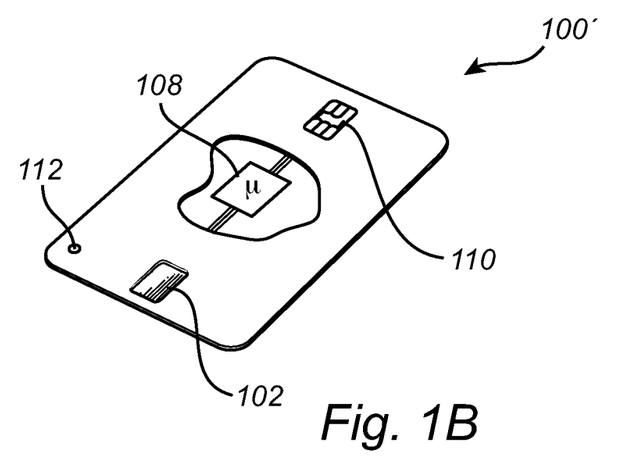

In FIG. 1B there is illustrated a second example of an electronic device according to the present disclosure, in the form of a smartcard 100', integrating a biometric sensing system including a fingerprint sensor 102 including a plurality of sensing features and configured for capturing a fingerprint representation of a fingerprint pattern of a finger of a user, as well as a control unit arrangement 108 connected to and configured to control the operation of the fingerprint sensor 102. In this embodiment the fingerprint sensor 102 is arranged on the front side of the smart card 100'. However, the fingerprint sensor 102 may as an alternative (or also) be provided on a back side of the smart card 100'. The fingerprint sensor 102 may, for example, be used for authenticating the user when performing a payment/transaction, for example allowing the smart card 100', once the finger of the user has been enrolled, to interact with e.g. a POS terminal. Furthermore, the smart card 100' may integrate a plurality of contact pads 110 electrically connected to at least the control unit 108, possibly allowing for providing a wired connection with the POS terminal if/when the smart card 100' is inserted in a card slot provided with the POS terminal.

In addition, the smart card 100' may in some embodiments also include a user interface, such as for example a light source 112 (e.g. a light emitting diode, LED) integrated with the smart card and arranged in electrical connection with control unit arrangement 108. Still further, the smart card 100' preferably comprises means (not shown) for allowing wireless interaction with the POS terminal, such as adapted for allowing near field communication (NFC) between the smart card 100' and the POS terminal. Accordingly, in using wireless communication the user need not insert the smart card 100' into the card slot of the POS terminal. The NFC connection between the smart card 100' and the POS terminal may further be used for providing electrical power to the smart card 100', in a manner known to the skilled person.

Figure 3A:
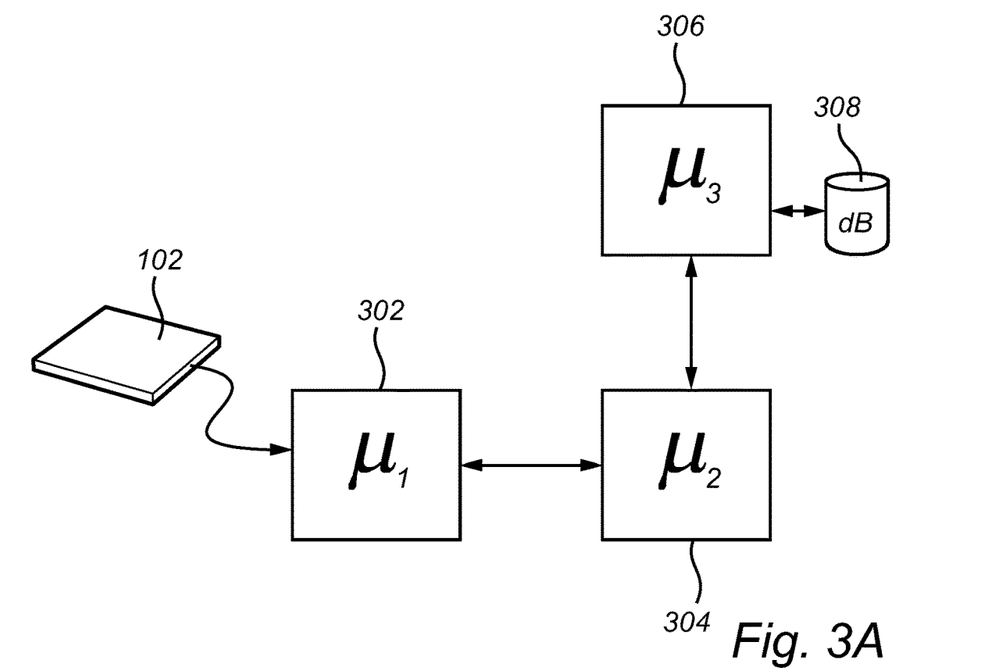

The control unit arrangement 108 is preferably arranged in communication with or comprises a memory, such as a database, e.g. for storing one or a plurality of fingerprint template for one or a plurality of fingers for the user. The control unit arrangement 108 may include one or a plurality of microprocessors, microcontrollers, programmable digital signal processors or other programmable devices. The control unit arrangement 108 may also, or instead, include one or a plurality of application specific integrated circuits, programmable gate arrays or programmable array logic, programmable logic devices, or digital signal processors.

Where the control unit arrangement 108 includes programmable devices such as microprocessors, microcontrollers or programmable digital signal processors as mentioned above, the processors may further include computer executable code that controls operation of the programmable devices. It should be understood that all or some parts of the functionality provided by means of the control unit arrangement 108 may be at least partly integrated with the fingerprint sensor 102. In relation to the present disclosure, the processing performed by the control unit arrangement 108 is partly split between a first 302, a second 304, and a third 306 control unit as will be further elaborated below in relation to FIG. 3.

Figure 2:
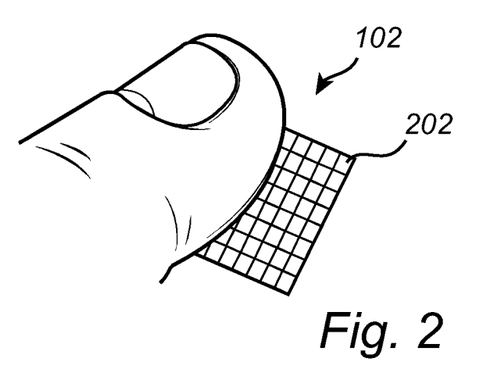

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing features, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202. It should however, as indicated above, be understood that the present disclosure may be applicable also to other types of fingerprint sensing technologies, such as optical, or thermal sensing technology, as well as a combination thereof. Both one and two-dimensional sensors are possible and within the scope of the present disclosure.

Figure 4:
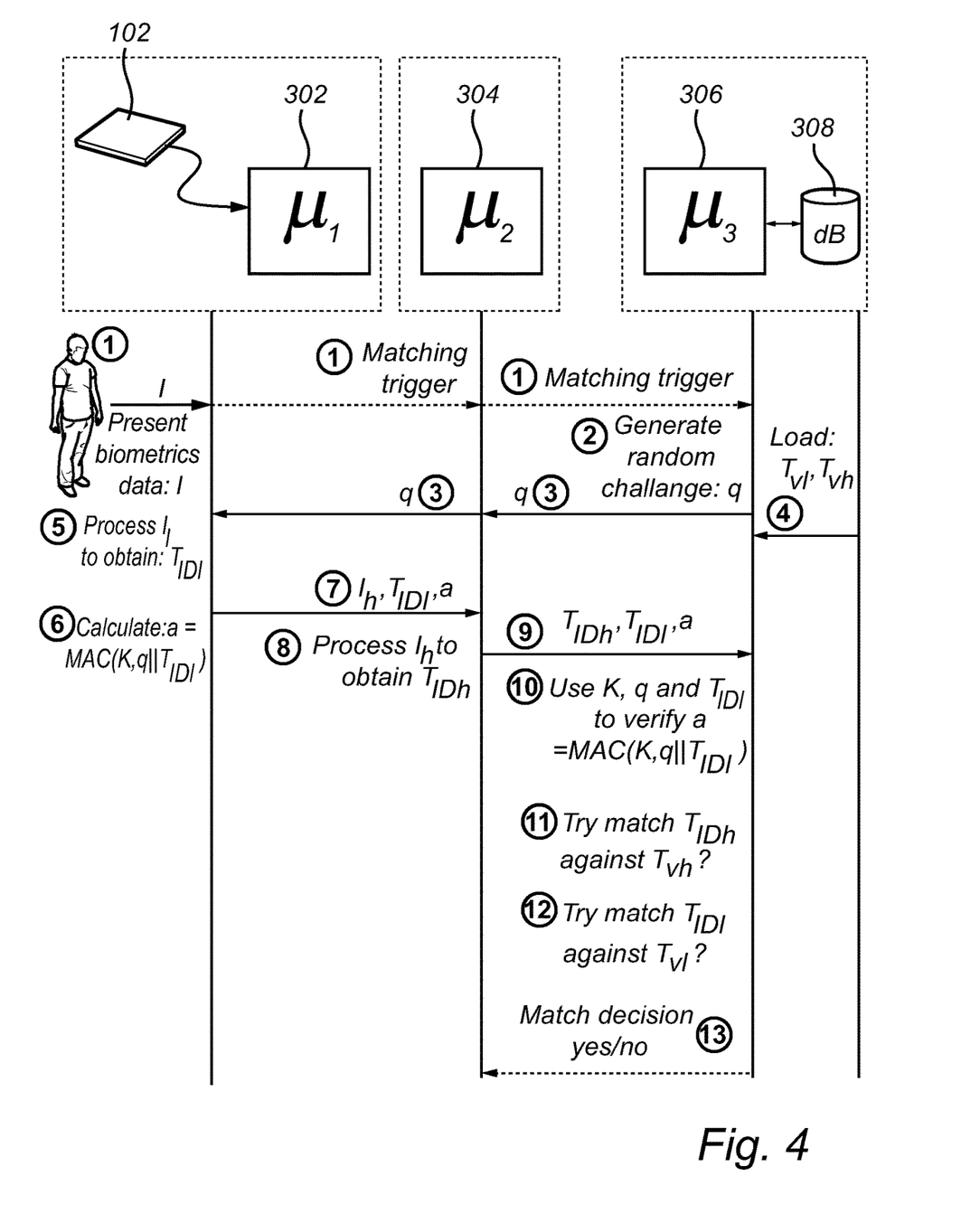
FIG. 4 presents a detailed message chart describing an embodiment of the authentication procedure.
Figure 5:
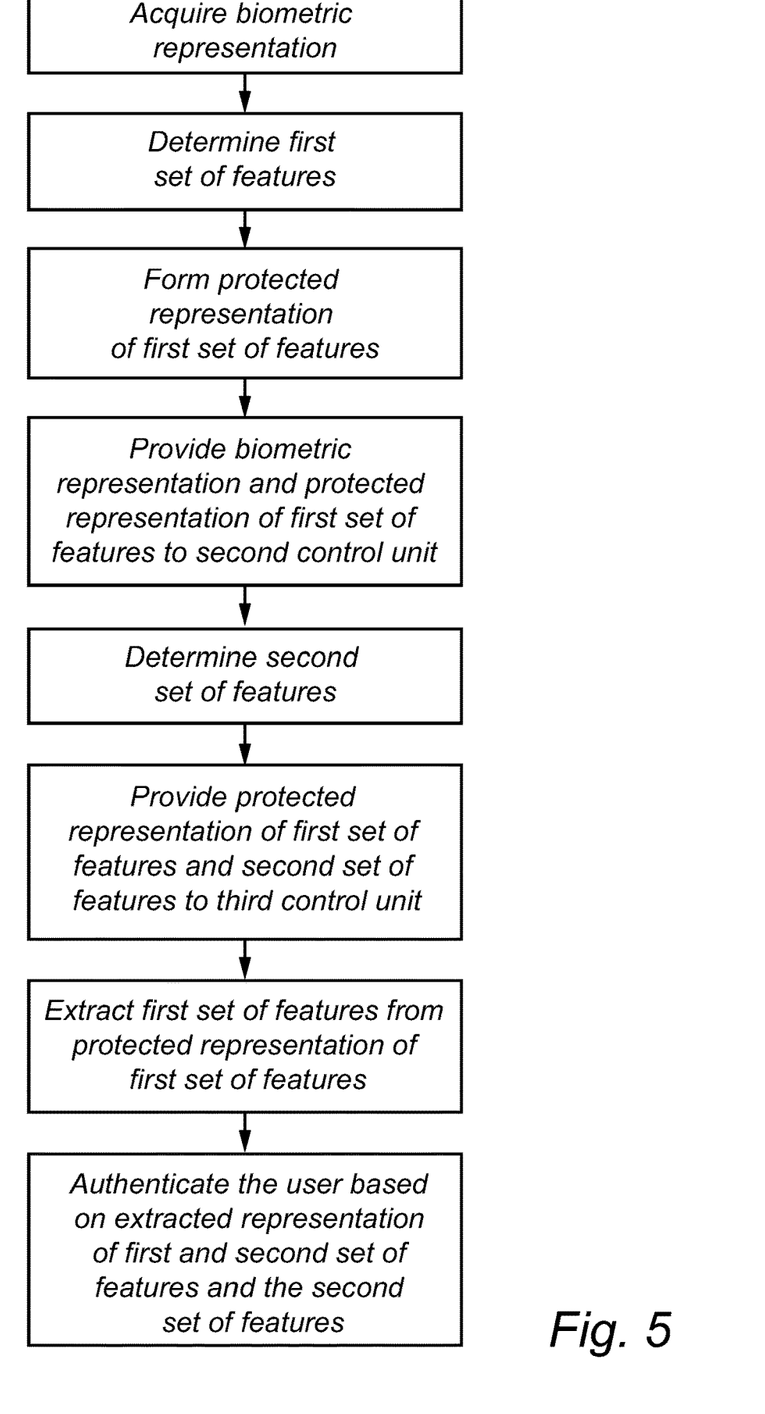
FIG. 5 is a flowchart disclosing the exemplary steps of the present disclosure.

Turning now to FIG. 3A in conjunction with FIGS. 4 and 5, there is conceptually illustrated a generalized possible implementation of the concept provided in accordance to the present disclosure. The example shown in FIG. 3A may generally be applicable to both of the examples of electronic devices 100, 100' as shown in FIGS. 1A and 1B, e.g. applicable to both the mobile phone and the smart card examples.

As was indicated above, the control unit arrangement 108 provided with the electronic device 100, 100' comprises a first, a second and a third control unit, 302, 304, and 306, respectively. In accordance with the present disclosure, the first control unit 302 is arranged in communication with the fingerprint sensor 102. At least one of the first 302 and the third control unit 306 may comprise a secure element.

The second control unit 304 is according to the present disclosure arranged in communication with the first 302 and the third 306 control unit. In line with the present disclosure, the first control unit 302 is arranged to provide a processing environment having a higher security level as compared to, at least, the second control unit 304. Also the third control unit is in a typical embodiment arranged to have a higher security level as compare to, at least, the second control unit 304. The third control unit 306 is in turn arranged in communication with or to comprise a memory element 308, for example comprising a data base adapted to store a previously enrolled representation (or fingerprint template) of the users finger (to be authenticated). In accordance to the present disclosure it is desirable to only allow access to the memory element 308 using the third control unit 306.

During operation of the electronic devices 100, 100' and in line with the illustration provided in FIG. 3, the first control unit 302 will be arranged to, in collaboration with the fingerprint sensor 102, acquire a fingerprint image of a finger of a user once the user's finger is arranged in the vicinity of or in contact with the fingerprint sensor 102.

Based on the fingerprint image, the first control unit 302 will determine a first set of characteristic features indicative of the user's fingerprint pattern present within the acquired fingerprint image. Different techniques for the extraction of characteristic fingerprint features are possible and within the scope of the present disclosure.

The first control unit 302 will subsequently form a protected representation of the first set of features. By means of the formation of the protected representation of the first set of features, it may be possible to ensure the integrity of the first set of features. This integrity of the first set of features may also include ensuring a freshness of the first set of features, meaning that an (in comparison) "old" version of the first set of features, in practice, could not be used for authenticating the user. That is, in case e.g. a hacker intends to make use of an old version of the first set of features he would not succeed, since the first set of features (by means of the integrity protection) could be adapted to e.g. comprise a time stamp (or similar) that may be verified in an authentication step (as will be further discussed below).

As is illustrated in FIG. 4, the integrity may for example be ensured using a challenge-response procedure. In such an embodiment it is assumed that a pre-configuration has taken place prior to the actual transmission of data between the control units 302, 304, 306. For example, a pre-shared, symmetric key, K, may be securely stored in the sensor/first control unit 302 and at the third control 306. In addition, in such an embodiment the third control unit 306 is preferably adapted to securely stored at least one pair of enrollment templates of the user in the related memory element 308, i.e. the: $T_{vh}$, $T_{vl}$.

In regards to FIG. 4, the following notations are used:
An end-user high resolution biometrics image: $I_h$
An end-user low resolution biometrics image: $I_l$
A biometrics high resolution verification template: $T_{vh}$
A biometrics low resolution verification template: $T_{vl}$
A biometrics high resolution identification template: $T_{IDh}$
A biometrics low resolution identification template: $T_{IDl}$
A shared (between sensor and a highly protected system) symmetric integrity protection key: K
A message authentication, taking a secret symmetric key K and a message, m as input: $\alpha$=MAC (K,m), and
A concatenation of two binary parameters: ||

The protected representation of the first set of features and the fingerprint image will then be provided to the second control unit 304. In an embodiment of the present disclosure, the second control unit 304 may for example be manifested by a "general" control unit comprised with the electronic device 100, 100', such as e.g. the common processor used for overall handling and control of the mobile phone 100 (e.g. handling calls, the display, etc.).

The second control unit 304 then determines a second set of features indicative of the fingerprint image. In comparison to the first set of features, the second set of features typically comprises "more information". That is, since the first control unit 302 typically has less computing power as compared to the second control unit 304, it is in accordance to the present disclosure desirable to e.g. scale the feature determination process to be different for the first 302 compared to the second control unit 304. Accordingly, in an embodiment of the present disclosure the first control unit 302 may for example be adapted to only handle a sub-section of the fingerprint image for determining the first set of features. Conversely, the second control unit 304 could then be adapted to form the second set of features based on (essentially) all of the acquired fingerprint image.

The second control unit 304 will then provide the protected representation of the first set of features and the second set of features to the third control unit 306. The third control unit 306 will subsequently extract the first set of features from the protected representation of the first set of features, thereby forming an extracted representation of the first set of features. Accordingly, the first 302 and the third 306 may for example employ at least one of a symmetric or asymmetric cryptography scheme for ensuring the integrity of the first set of features. Accordingly, once extracted at the third control unit 306, the selected cryptography scheme may be used for ensure that the first set of features are "fresh" (e.g. based on the mentioned time stamp, or similar) and that the first set of features are "untouched" when relayed from the first 302 to the third control unit 306 (i.e. passing "through" the second control unit 304).

The third control unit 306 will then authenticate the user. This authentication will in line with the present disclosure preferably be implemented as a "double matching", meaning that the user is only authenticated in case both the first and the second set of features are correctly matched with the previously enrolled fingerprint template stored at the memory element 308. In an embodiment of the present disclosure, it may for example be possible to allow the memory element 308 to store both of a first fingerprint template portion ($T_{vl}$) corresponding to a structure of the extracted representation of the first set of features, and a second biometric template portion ($T_{vh}$) corresponding to a structure of the second set of features. As such, two separate matching processes may be performed, where the user only is authenticated in case both the matching processes are successful. In addition, in line with the above discussed freshness, the timestamp information may additionally be used as a component of the authentication process.

In case there is a "double match", the third control unit 306 may output an authentication signal. The authentication signal may subsequently be used for e.g. unlocking the mobile phone 100 or the smart card 100'.

Figure 3B:
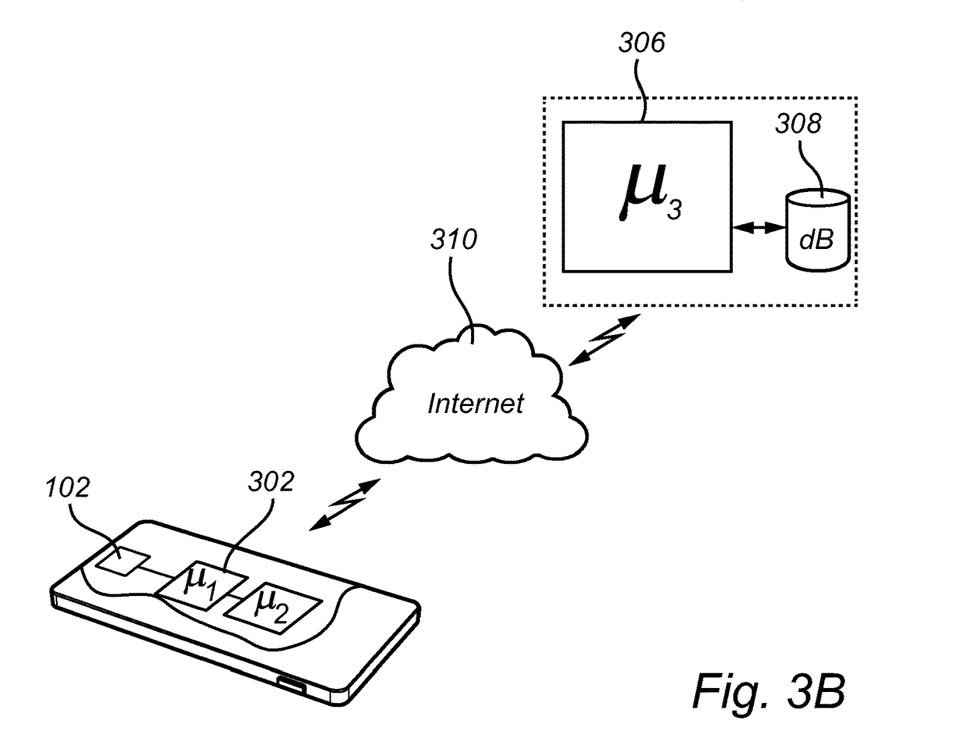
FIG. 3B shows an alternative distributed architecture in line with the present disclosure.

Within the scope of the present disclosure it should be understood that the third control unit 306 not necessarily must be arranged as an integrated component with the electronic device. Rather, and as is exemplified in FIG. 3B, the third control unit 306 may be arranged separately (e.g. remotely) from the electronic device 306. For example, the third control unit 306 may in one embodiment be a server arranged in communication (using e.g. a network communication 310) with the second control unit 304. In such an embodiment also the message chart as exemplified in FIG. 4 may be adapted to correspond to such an implementation.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other features or steps, and the indefinite article "a" or "an" does not exclude a plurality.

The invention claimed is:

1. A method of authenticating a user using an electronic device, the electronic device comprising:
    a fingerprint sensor configured to acquire a fingerprint pattern of the user,
    a first computer processor connected to the fingerprint sensor and adapted to provide a computational processing environment having a first security level for computational processing,
    a second computer processor arranged in communication with the first computer processor and adapted to provide a computational processing environment having a second security level for computational processing, wherein the second computer processor is a general processor for the electronic device that is configured to at least partly control a display screen of the electronic device, and
    a third computer processor arranged in communication with the second computer processor and adapted to provide a computational processing environment having a third security level for computational processing, wherein the second security level is lower than the first and the third security level and the method comprises the steps of:
    acquiring a fingerprint pattern using the fingerprint sensor and the first computer processor,
    determining, using the first computer processor, a first set of features indicative of the fingerprint pattern, wherein the first set of features is based on a first depiction of the fingerprint pattern,
    forming, using the first computer processor, a protected representation of the first set of features,
    providing the fingerprint pattern and the protected representation of the first set of features to the second computer processor,
    determining, using the second computer processor, a second set of features indicative of the fingerprint pattern, wherein the second set of features is based on a second depiction of the fingerprint pattern, the second depiction being at least partly different than the first depiction,
    providing the protected representation of the first set of features and the second set of features to the third computer processor,
    extracting, at the third computer processor, the first set of features from the protected representation of the first set of features, thereby forming an extracted representation of the first set of features, and
    authenticating, at the third computer processor, the user based on a fingerprint template arrangement representative for the biometric fingerprint pattern of the user, the extracted representation of the first set of features, and the second set of features, wherein the fingerprint template arrangement is stored with a memory associated with the third computer processor.

2. The method according to claim 1, wherein the step of extracting the protected representation of the first set of features comprises providing a challenge from the third computer processor to the first computer processor.

3. The method according to claim 2, wherein the challenged is relayed through the second computer processor.

4. The method according to claim 1, wherein the step of forming the protected representation of the first set of features comprises including a timestamp with the protected representation of the first set of features.

5. The method according to claim 4, wherein the step of authenticating the user is further dependent on the timestamp.

6. The method according to claim 1, wherein the first and the third computer processor is adapted to provide a secure processing environment.

7. The method according to claim 1, wherein the fingerprint template arrangement comprises a first ($T_{vf}$) and a second ($T_{vh}$) fingerprint template portion.

8. The method according to claim 7, wherein:
the first fingerprint template portion ($T_{vf}$) corresponding to a structure of the extracted representation of the first set of features, and
the second fingerprint template portion ($T_{vh}$) corresponding to a structure of the second set of features.

9. The method according to claim 7, wherein the user is authenticated based both on a first comparison between the extracted representation of the first set of features and the first fingerprint template portion and a second comparison between the second set of features and the second fingerprint template portion.

10. The method according to claim 9, wherein the user is authenticated if the both the first and the second comparison is indicated as successful.

11. The method according to claim 1, further comprising the steps of:
forming, using the second computer processor, a protected representation of the second set of features, and
extracting, at the third computer processor, the second set of features from the protected representation of the second set of features, thereby forming an extracted representation of the second set of features.

12. The method according to claim 11, wherein the protected representation of the second set of features is formed using a key being different from a key used for forming the protected representation of the first set of features.

13. The method according to claim 1, wherein the first set of features is determined from a sub-section of the fingerprint pattern.

14. The method according to claim 1, wherein first computer processor and the third computer processor shares a symmetric integrity protection key (K) for protecting and extracting of the first set of features.

15. The method according to claim 1, wherein first computer processor and the third computer processor are adapted to apply a scheme based on asymmetric cryptography for integrity protection of at least one of the first and the second set of features.

16. The method according to claim 1, wherein the step of first set of features comprises determining a ridge flow from the fingerprint pattern.

17. The method according to claim 1, wherein the first depiction of the fingerprint pattern is at a first resolution and the second depiction of the fingerprint pattern is at a second resolution, wherein the first resolution is lower than the second resolution.

18. The method according to claim 1, wherein the first depiction of the fingerprint pattern comprises a sub-section of the fingerprint pattern generated by a cropping process, a decimation process, and/or a truncation process.

19. An electronic device, comprising:
a fingerprint sensor configured to acquire a fingerprint pattern of the user,
a first computer processor connected to the fingerprint sensor and adapted to provide a computational processing environment having a first security level for computational processing, and
a second computer processor arranged in communication with the first computer processor and adapted to provide a computational processing environment having a second security level for computational processing, wherein the second computer processor is a general processor for the electronic device that is configured to at least partly control a display screen of the electronic device, wherein the electronic device is adapted to:
acquire a fingerprint pattern using the fingerprint sensor and the first computer processor,
determine, using the first computer processor, a first set of features indicative of the fingerprint pattern, wherein the first set of features is based on a first depiction of the fingerprint pattern,
form, using the first computer processor, a protected representation of the first set of features,
provide the fingerprint pattern and the protected representation of the first set of features to the second computer processor,
determine, using the second computer processor, a second set of features indicative of the fingerprint pattern, wherein the second set of features is based on a second depiction of the fingerprint pattern, the second depiction being at least partly different than the first depiction,
provide the protected representation of the first set of features and the second set of features to a third computer processor, wherein the third computer processor is arranged in communication with the second computer processor and adapted to provide a computational processing environment having a third security level for computational processing, the second security level being lower than the first and the third security level,
extract, at the third computer processor, the first set of features from the protected representation of the first set of features, thereby forming an extracted representation of the first set of features, and
authenticate, at the third computer processor, the user based on a fingerprint template arrangement representative for the fingerprint pattern of the user, the extracted representation of the first set of features, and the second set of features, wherein the fingerprint template arrangement is stored with a memory associated with the third computer processor.

20. A computer program product comprising a non-transitory computer readable medium having stored thereon computer program means for operating an electronic device, the electronic device comprising:
a fingerprint sensor configured to acquire a fingerprint pattern of the user,
a first computer processor connected to the fingerprint sensor and adapted to provide a computational processing environment having a first security level for computational processing,
a second computer processor arranged in communication with the first computer processor and adapted to provide a computational processing environment having a second security level for computational processing, wherein the second computer processor is a general processor for the electronic device that is configured to at least partly control a display screen of the electronic device, and a third computer processor arranged in communication with the second computer processor and adapted to provide a computational processing environment having a third security level for computational processing, wherein the second security level is lower than the first and the third security level and the computer program product comprises:

code for acquiring a fingerprint pattern using the fingerprint sensor and the first computer processor, code for determining, using the first computer processor, a first set of features indicative of the fingerprint pattern, wherein the first set of features is based on a first depiction of the fingerprint pattern, code for forming, using the first computer processor, a protected representation of the first set of features, code for providing the fingerprint pattern and the protected representation of the first set of features to the second computer processor, code for determining, using the second computer processor, a second set of features indicative of the fingerprint pattern, wherein the second set of features is based on a second depiction of the fingerprint pattern, the second depiction being at least partly different than the first depiction, code for providing the protected representation of the first set of features and the second set of features to the third computer processor, code for extracting, at the third computer processor, the first set of features from the protected representation of the first set of features, thereby forming an extracted representation of the first set of features, and code for authenticating, at the third computer processor, the user based on a fingerprint template arrangement representative for the fingerprint pattern of the user, the extracted representation of the first set of features, and the second set of features, wherein the fingerprint template arrangement is stored with a memory associated with the third computer processor.

* * * * *